May 17, 1932. R. W. CANFIELD 1,859,233
CONTINUOUSLY OPERATING GLASSWARE FORMING MACHINE
Filed June 15, 1929 4 Sheets-Sheet 1

Inventor:
Robert W. Canfield
by Brown & Parham
Attorneys

Witness:
W. B. Thayer

May 17, 1932.  R. W. CANFIELD  1,859,233
CONTINUOUSLY OPERATING GLASSWARE FORMING MACHINE
Filed June 15, 1929  4 Sheets-Sheet 4

UNITED STATES PATENT OFFICE

ROBERT W. CANFIELD, OF WEST HARTFORD, CONNECTICUT, ASSIGNOR TO HARTFORD-EMPIRE COMPANY, OF HARTFORD, CONNECTICUT, A CORPORATION OF DELAWARE

CONTINUOUSLY OPERATING GLASSWARE FORMING MACHINE

Application filed June 15, 1929. Serial No. 371,137.

My invention relates generally to the manufacture of hollow glassware and has particular relation to glassware forming apparatus of the type having plural cavity blank molds and plural cavity finishing or blow molds, the glass for each article being given a preliminary shape in a blank mold and transferred to a blow mold in which the formation thereof is completed.

It has been proposed to employ continuously operating or rotating two-table glassware forming machines embodying means for effecting the transfer of successively formed blanks from the blank molds on one of the tables to the blow molds on the other of the tables without interrupting the operation of the machine. The desirability from a practical standpoint of operating such machines continuously will be obvious; but difficulties have been encountered in accomplishing the transfer of the successively formed blanks between the blank molds and the blow molds. In my copending application, Serial No. 343,614, filed March 1, 1929, I have disclosed and claimed a novel apparatus of the above character wherein the use of plural cavity molds is contemplated, together with methods adapted to be performed by the use of such apparatus. As set forth in said application, the difficulties of transferring a plurality of blanks from a plural cavity blank mold to a cooperating plural cavity blow mold may be overcome in a novel manner by causing the neck ring of the blank forming unit and the blank suspended therefrom and the cooperating blow mold to travel along coincident paths.

In some instances, it is advantageous to employ tongs for transferring blanks from the blank mold to the blow mold and in my copending application, Serial No. 351,426, filed March 30, 1929, I have disclosed and claimed a novel apparatus and a method whereby tongs may be employed in a continuously rotating two-table glassware forming machine. One of the advantages in employing tongs for transferring the blank is that if the tongs are mounted on the blow mold table, they may also be used to take out the finished articles from the blow mold and to place them upon a take-out table, or the like.

It is an object of the present invention to provide a novel apparatus and a method whereby the separate and combined advantages of the inventions of my above-mentioned prior applications are obtained in a continuously operating two-table forming machine. For the accomplishment of this object I may employ tongs for effecting the simultaneous transfer of a plurality of blanks from a plural cavity blank mold unit in which they are formed to a cooperating plural cavity blow mold, and for removing the finished articles from the blow mold.

It also is an object of my invention to provide a novel method of, and apparatus for, forming glassware, wherein a plurality of blanks are simultaneously formed in a plural cavity blank forming unit, and are thereafter simultaneously transferred from said unit to a plural cavity finishing mold, the said unit and mold being continuously rotated, and the transfer being effected by simultaneously removing the blanks from the unit and rotating the blanks as a unit about a vertical axis to align them with the cavities of the finishing mold.

A further object of my invention is to provide a novel two-table glassware forming machine including floating tongs transfer mechanism, which, while capable of being employed advantageously in machines having single cavity molds, is particularly well adapted for use with plural cavity molds in that the tongs are adapted to be brought into alignment with a blank forming unit and with the previously formed blanks carried thereby, and to travel while in such alignment. This enables the tongs to remove the blanks from the blank forming unit in an efficient manner but prevents the blanks from being deformed or losing their shapes.

Another object of my invention is to provide a novel apparatus of the above character including floating tongs mechanism which may be rotated about the axis of the blow mold table, yet which is capable of following the path of travel of the blank forming unit about the axis of the blank mold table to remove a blank or blanks therefrom, and to move the blank or blanks radially of the blow mold table and into a position to be received by the blow molds.

It also is an object of my invention to provide in a two-table glassware forming machine novel floating tongs mechanism adapted to travel along the path of travel of the blank forming unit while being operated to engage a blank or blanks to remove the same from the said unit; to transfer the blank or blanks to a blow mold on the blow mold table, and to take out the finished article or articles from the blow mold.

Other objects and advantages of the invention will be pointed out in the detailed description thereof which follows or will become apparent from such description.

In order that the principle of my invention may be readily comprehended and its manifold advantages understood, reference should be had to the accompanying drawings in which I have illustrated one embodiment thereof.

In general, the apparatus illustrated comprises a continuously rotating blank or parison mold table and a continuously rotating finishing mold table, each table having a plurality of molds mounted thereon. Each of the glass receiving and blank forming units may comprise a divided blank mold having plural cavities formed therein, a plural head structure for cooperating with the blank mold, and a plurality of bottom plates adapted to be brought into engagement with the blank mold after charges of glass have been gathered thereby. The blank forming unit may be charged with glass by the well known suction method, the blank mold and head structure being supported for movement vertically so that the said blank mold may be lowered at the proper time in the cycle of rotation of the supporting table, into position to contact with the surface of the glass in the gathering pool, suction then being applied from the head structure to the cavities of the blank mold to draw glass thereinto for filling said cavities. The rotation of the table carries the glass receiving and blank forming unit away from the gathering pool, whereupon the charges of glass are severed from the glass in the pool by suitable shearing means, not shown. The bottom plates previously referred to may then be moved into engagement with the lower end of the blank mold to close the lower ends of the cavities. This permits the application of positive pressure to the head structure to partially expand the glass in the cavities of the blank mold, if such expansion of the glass is desirable or necessary.

The blow mold table, which may be arranged to rotate adjacent to the blank mold table, may carry divided plural cavity blow molds corresponding in number and relative arrangement on the blow mold table to the number and arrangement of the blank forming units on the blank mold table. The blow mold table also may carry a plurality of transfer units, there being one transfer unit associated with each blow mold. Each transfer unit may comprise a pair of floating tongs mounted upon a carriage and adapted to be reciprocated radially of the blow mold table.

As the blank forming unit is rotated toward the transfer point between the two tables, the blank mold may be opened leaving the blanks supported between the bottom plates and the blow head structure. As the blank forming unit and the cooperating floating tongs mechanism approach each other, the tongs may be moved radially outwardly of the blow mold table. The tongs mechanism may be provided with a guide or yoke adapted to cooperate with and engage the head structure of the blank forming unit. As a result of the provision of this guide and the construction which permits the tongs to float, the tongs may be brought into alignment with the blank prior to the time that the blank forming unit and the tongs carriage come into alignment and caused to travel in a path coincident with the path of travel of the blanks. The tongs mechanism and the blank forming unit may be so constructed that as the blank forming unit and tongs are carried into cooperating relation, the tongs are closed about the previously formed blank. During the period of coincident travel of the tongs and blanks, the bottom plates may be lowered out of engagement with the blank and the blow head structure may be raised leaving the blanks supported solely by the tongs. Thereupon, the continued rotation of the two tables may cause the tongs unit to be removed from engagement with the blank forming unit, and the tongs unit together with the blank carried thereby may be moved radially inwardly of the blow mold table to bring the blanks into alignment with the centers of the blow mold. Thereafter, the blow mold may be closed about the blanks, and the tongs opened, the blanks then being blown to final shape in the blow mold by suitable blowing means.

The tongs mechanism also may operate to grasp the finished articles at or about the takeout point to move the finished articles outwardly radially of the blow mold tables and to deposit them upon a takeout table or the like. Subsequently, the tongs unit and the cooperating blow mold unit may be carried toward the transfer point to begin another cycle of operations.

Referring in detail to the drawings:

The illustrated embodiment of the invention comprises a parison or blank mold table 1 arranged to rotate about the axis of the vertical column 2. The table 1 may be rotated in any suitable known manner, but preferably is rotated by means of a shaft 3 suitably journaled in the base 4 of the blank mold table and in the base 5 of the blow mold table as shown. The shaft 3 may carry a pulley wheel 6 fixed thereto and driven by a belt (not shown). The end portion of the shaft 3 which is journaled in the blank mold table carries a beveled pinion gear 7, Fig. 2, which meshes with a beveled gear 8 carried by a vertical shaft 9, also journaled in the base 4 of the blank mold table. A pinion gear 10 is keyed to the upper end of the shaft 9. This pinion gear meshes with a ring gear 11 provided on the hub portion of the blank mold table. At its opposite end, the shaft 3 has a beveled pinion gear 12 fixed thereto, Fig. 1, which meshes with a beveled gear 13 fixed to the lower end of a vertical shaft 14, journaled in the base of the blow mold table. The blow mold table is rotatably supported by the column 18. This shaft 14 also carries a pinion gear 15 at its upper end, which meshes with a ring gear 16 provided on the blow mold table 17, as shown. This construction assures that the mold tables will be driven in timed relation to each other.

Figures 5, 6:
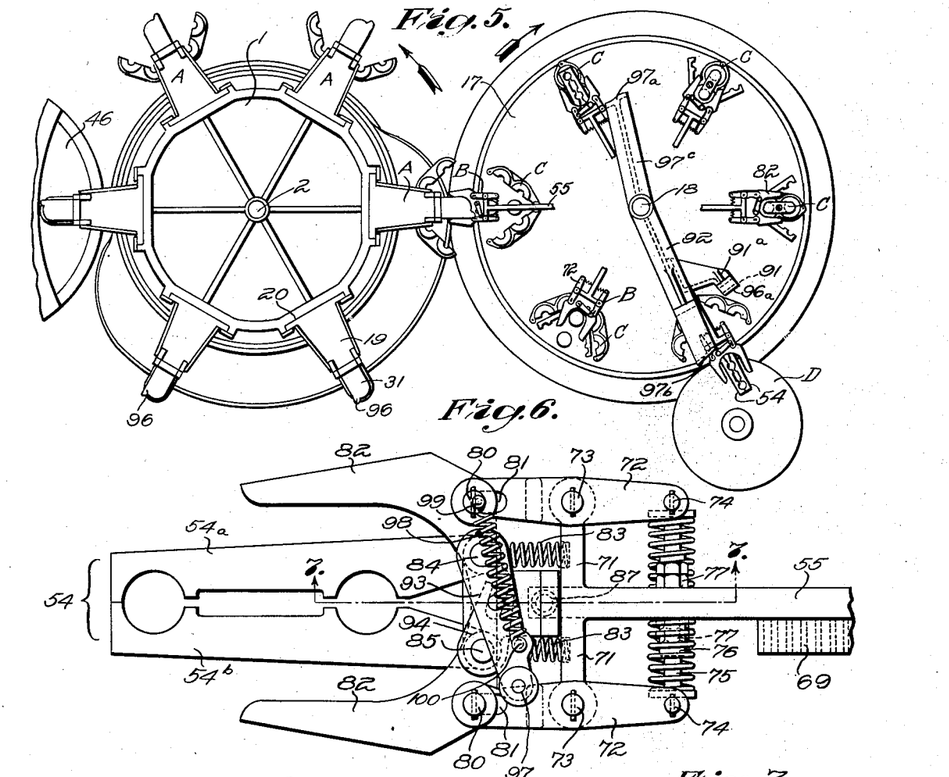
Fig. 5 is a diagrammatic view in top plan of the assembled machine showing the parts thereof in the positions in which glass is being gathered by one of the blank mold units from a gathering pool, previously formed blanks are being grasped by the appropriate tongs mechanism at the transfer station, and another pair of tongs is about to place finished articles on the takeout table.
Fig. 6 is a view in top plan on an enlarged scale, showing in detail the construction of the floating tongs mechanism.
Figure 7:
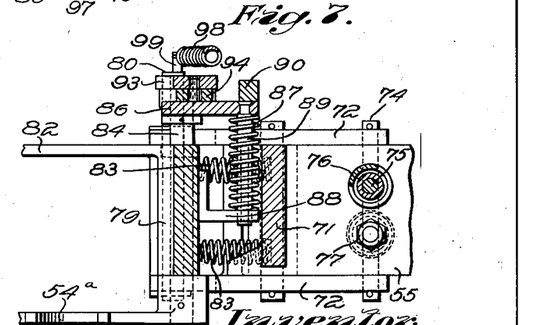
Fig. 7 is a view in vertical sectional elevation of the construction shown in Fig. 6 and taken on the line 7—7 of said figure.

The table 1 carries a plurality of glass receiving and parison or blank forming units, indicated generally at A. These units may be identical in construction and a description of one will suffice for all. Each mold unit includes a vertically reciprocable carriage 19 mounted in a guideway 20, Fig. 5. The carriage includes a lower horizontal arm 21 upon which is mounted an upstanding pivot element 22 upon which the arms 23 of blank mold holders 24 are pivotally mounted. Each of these mold holders carries a plurality of mold sections 25 so that sections on the two holders cooperate to provide a plural cavity blank mold. These sections 25 may be formed integrally, or separately as desired.

The blank mold is opened and closed at appropriate times by the admission and exhaust of fluid pressure to the spaces in the opposite end of a cylinder 28. The rod of the piston in this cylinder is connected to a cross head 29 to the ends of which are connected downwardly extending rods 30 connected by suitable mechanism to the blank mold supports so that reciprocation of the rods 30 will open and close the blank mold. Such mechanism is shown in detail in my copending application, Serial No. 343,614 previously referred to, and forms no part of the present invention.

A head structure 31 is slidably supported for vertical reciprocation in a guideway 32 which guideway is formed at the outer end of a shelf or arm portion 33 of the carriage 19. The head 31 is raised and lowered at appropriate times by the admission and exhaust of fluid pressure to and from the spaces in the opposite ends of a cylinder 34. The rod 35 of the piston which is located in said cylinder is engaged with one end of a bell crank lever 36, the other end of which is connected by a link 37 to the blow head 31. Thus it will be seen that the reciprocation of the piston in the cylinder 34 will cause the blowhead 31 to be raised or lowered.

In order to insure that the cavities in the blow head 31 will be held in alignment with the cavities in the blank mold, the blow head 31 is provided with projections 38 which fit in openings 39 formed in the blank mold section when the blank mold is closed. The cavities in the blank mold section and the cooperating cavities in the blow head are so shaped that part of the neck finish of a blank may be formed in the blank mold and part in the head structure. This permits the blanks to be readily removed from the blank mold unit after the blank mold has opened and the head has been raised without necessarily raising the blanks.

As previously stated, the blank mold unit is is adapted to be moved vertically relative to its table to gather glass from a gathering pool. To this end, a bell crank lever 40 is pivoted to the table 1 as indicated at 41. On its lower arm this lever carries a cam roller 42 which engages a stationary cam 43 provided on the base 4 of the blank mold table. The upper arm of the bell crank lever is provided with a screw 44 which engages the bottom of the lower arm 21 of the carriage 19. The cam 43 is so shaped that as the blank mold unit is rotated toward the gathering pool indicated at 46, Fig. 5, the blank mold unit is lowered to dip the bottom of the blank mold into contact with the surface of the glass in the gathering pool. At this time, a vacuum is produced in the cavities of the blank mold to cause charges of glass to be gathered therein. As the blank mold unit swings away from the gathering pool suitable shearing mechanism, not shown, operates to sever the charges of glass from the glass in the gathering pool. Such mechanism may be adapted to remain in engagement with the bottom of the mold to support the charges, and while air is admitted through the head structure 31 to assist in forming initial blowing cavities. Instead of employing such mechanism for supporting the charges, bottom plates may be used as hereinafter described.

The blank mold unit may be provided with bottom plates 48 carried by an arm 49 pivoted at 50 to a downwardly extending bracket carried by the arm 21 of the blank mold carriage. The bottom plates are raised and lowered at appropriate times by the cooperation of a cam roller 51 on the arm 49 with a stationary cam path 52 mounted on the base 4 of the blank mold table. After charges of glass have been gathered by the blank mold, the blank mold unit is raised out of gathering position and the glass is severed from the charges, the bottom plates thereupon being brought into engagement with the blank mold. These bottom plates permit positive pressure to be applied through the blow head 31 to assist in shaping the blanks and also serve together with the blowhead to support the blanks after they are formed and after the blank mold is open.

As the rotation of the blank mold table carries the blank mold toward the transfer point between the mold tables, the blank mold is opened leaving the blanks supported by and between the bottom plates and the blow head as described above. At this time, one of the transfer devices, which will be presently described, also is moved toward the transfer point and is brought into position to engage the blanks while they rotate about the axis of the blank mold table. The transfer devices or tongs are designated generally at B, there being a transfer device associated with and supported above each of the blow molds C.

Each of the transfer devices includes a pair of cooperating tongs members 54a and 54b adapted to hold a plurality of blanks, and connected by mechanism, to be hereinafter described, to a carriage 55. The carriage 55 is slidably supported for radial movement inwardly and outwardly of the blow mold table between vertically spaced offset rollers 56 and 57. These rollers are suitably journaled between the upwardly projecting slides 58 of a bracket or support 59 fixed to and carried by the blow mold table. Mounted in a guideway indicated at 60 formed in the support 59 is a slide 61. At its inner end, the slide 61 carries a cam roller 62 which travels in a cam path 63 formed in a stationary plate 64 mounted on the column of the blow mold table. The shape of the cam path 63 is such as to cause inward and outward radial movements of the slide 61 at appropriate times for causing similar movements in opposite directions of the carriage 55 and the tongs 54. Such movements of slide 61 are transmitted to the carriage 55 by the following means: A rack 65 formed on the slide 61 engages a pinion gear 66 mounted on a shaft 67 suitably journaled between the sides 58 of the support 59, previously referred to. Shaft 67 also carries a large spur gear 68 which meshes with a rack 69 provided on the carriage 55. The gear 68 being substantially larger than gear 66, movements of slide 61 radially of the blow mold table will cause a proportionately greater radial movement of the carriage 55 and the tongs.

As stated hereinbefore, the tongs and associated mechanism are so constructed that the tongs members are capable of floating action with respect to their carriage or support. They are also adapted to be moved vertically. The features of construction for permitting such movements of the tongs and the construction of the operating mechanism therefor now will be described with particular reference to Figs. 3, 6, 7 and 8. At its outer end, the carriage 55 is T-shaped. This shape of the end of the carriage provides oppositely extending arms 71. To the outer ends of these arms are pivoted levers 72, each of which has the general shape of the letter H placed on its side. The pivotal connections are provided by vertical pivot elements 73 which extend through registering openings formed respectively in the inner end portions of the levers and in the ends of the arms 71 which extend between the vertically spaced members of said inner end portions of the levers. The levers 72 are yieldingly held in parallel relation to the main part of the carriage 55 by the following means: Extending between the members at the inner end of each of the levers 72 is a vertical pin 74. Horizontal bolts or plungers 75 are slidably mounted in suitable openings in vertically offset relation in the main portion of the carriage. These bolts or plungers are yieldingly held in contact with the pins 74 by means of springs 76 interposed between the heads of the bolts and the sides of the carriage 55. These plungers or bolts are prevented from moving out of the openings in the carriage under the influence of the springs 76 by stop nuts 77 on the ends of such plungers or bolts. These spring pressed members 75 serve as spring buffers in addition to positioning the levers and the parts carried thereby in parallel relation with the carriage.

Between the outer ends of the levers 72 is mounted a member 79 of right angular shape. The vertical leg of the member 79 which extends between the vertically spaced members of the outer portions of the levers 72 is pivotally connected to said levers by means of the vertical pivot elements 80 which extend through suitable openings in the member 79 and through slots 81 provided in the outer ends of the levers. The upper horizontal leg of the member 79 is cut away to form a guide 82 which is adapted to partially embrace and engage a suitably shaped member of or associated with each blank forming unit, as for example the head 31, in a manner and for a purpose to be hereinafter described. The member 79 is yieldingly held in spaced parallel relation to the outer face of the T-shaped carriage by means of compression springs 83 interposed between the rear face of the vertical leg of the member 79 and the outer faces of the oppositely extending portions 71 of the carriage. The pressure of these springs yieldingly retains the pins 80 at the outer ends of the slots 81, previously referred to.

The members 54a and 54b of the tongs are fixed to the lower ends of rock shafts 84 and 85 slidably mounted in vertical openings provided in the vertical leg of the member 79. Connected to the upper ends of the rock shafts 84 and 85 is a cross head 86. The tongs members 54a and 54b are yieldingly held in their uppermost position by means of a spring 87 interposed between the cross head 86 and the horizontal leg of a bracket 88 mounted on the inner face of the vertical leg of the member 79. The spring 87 surrounds a guide member 89 mounted on the cross head 86, which member is slidably received by an opening in the bracket 88, as shown. The cross head 86 also serves as an operating means whereby the tongs may be lowered relative to the carriage to permit them to engage completed articles at or near the takeout position. To this end, the cross head 86 is provided with a runner or cam 90 which is engaged at an appropriate time by a stationary downwardly facing cam 91 carried on the end of a branch 91a of an arm 92 secured to the column of the blow mold table, Figs. 4 and 5.

The mechanism for opening and closing the tongs is as follows: Connected to the upper end of the rock shaft 84 is a crank arm 93. This crank arm is connected by means of a pin and slot connection to a shorter crank arm 94 connected to the upper end of the rock shaft 85. Thus it will be seen that swinging movement of the crank arm 93 in one direction about the axis of the rock shaft 84 will close the tongs, whereas swinging movement thereof in the opposite direction will cause the tongs to open. Movement of the crank arm to close the tongs is caused by the engagement of an outwardly facing cam 96 on the head structure of a blank mold unit with a roller 97 mounted on the outer end of the crank arm 93. Thus the closing of the tongs is controlled in timed relation to the engagement of the tongs with the blank mold unit with which it cooperates. Movement of the crank arm 93 to close the tongs about finished articles near the takeout position is effected by an outwardly facing cam 96a formed on the branch 91a of arm 92, Figs. 4 and 5. Movement of the crank arm to open the tongs is caused by the successive engagements of the roller 97 with outwardly facing cams 97a, 97b. Cam 97a is formed on the end of a stationary arm 97c, Fig. 5, and cam 97b is formed on the outer end of arm 92, previously referred to. These cams are so located as to cause the tongs to open, first, after the blow mold has closed about the blanks transferred thereto by the tongs, and second, after the tongs have transferred the finished articles to the takeout table D.

The tongs are caused to open and close with a snap action by means of a dead center tension spring 98. One end of this spring is suitably connected to the upper end of one of the pivot members 80, as indicated at 99, while the opposite end of the said spring is connected to the crank arm 93 by means of a pin 100 mounted near one edge of and near the end of the crank arm 93, as shown. The action of this spring 98 will be readily understood; as the crank arm 93 is caused to move to the right or to the left, the spring 98 approaches, then passes dead center position, causing the tongs to be quickly opened or closed.

Figure 1:
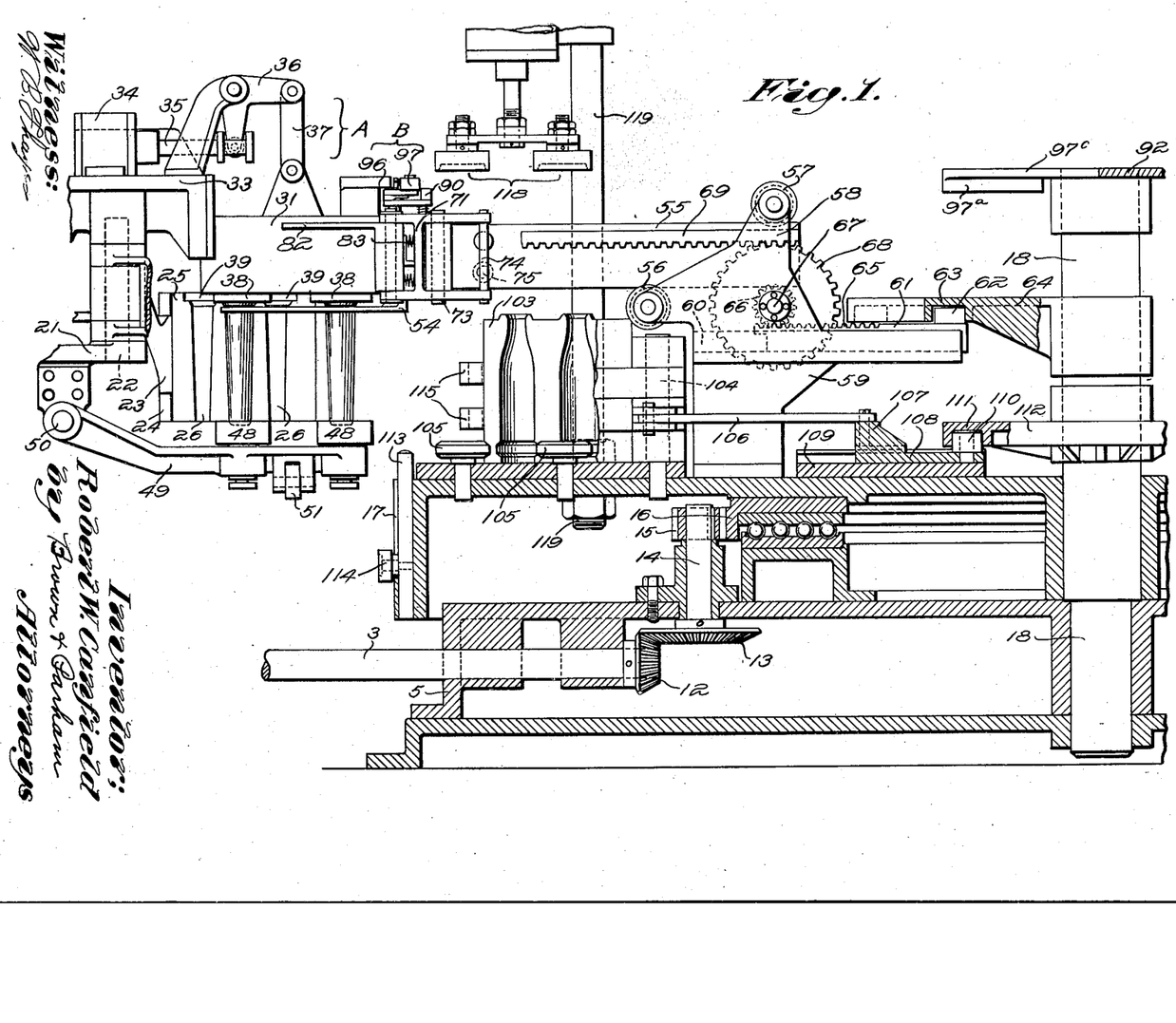
Figure 1 is a view in longitudinal vertical sectional elevation of a fragmentary portion of a forming machine embodying my invention, showing principally the blow mold table, and showing the various parts of the machine in the positions which they assume at the time that one of the tongs mechanisms is travelling with a blank mold unit, and the tongs have been operated to grip a plurality of blanks to remove the same from said unit.
Figure 2:
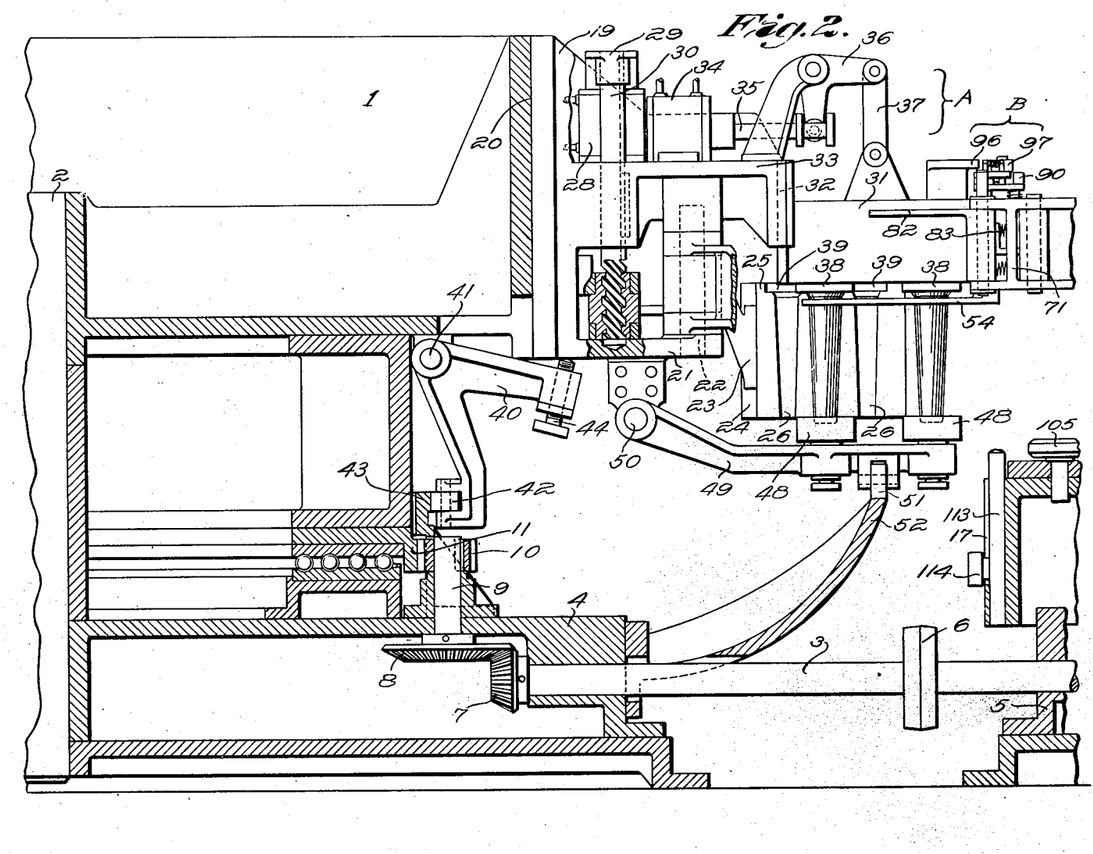
Fig. 2 is a view similar to Fig. 1, but showing principally the construction of the blank mold table and the arrangement of one of the blank forming units carried thereby.
Figures 3, 4:
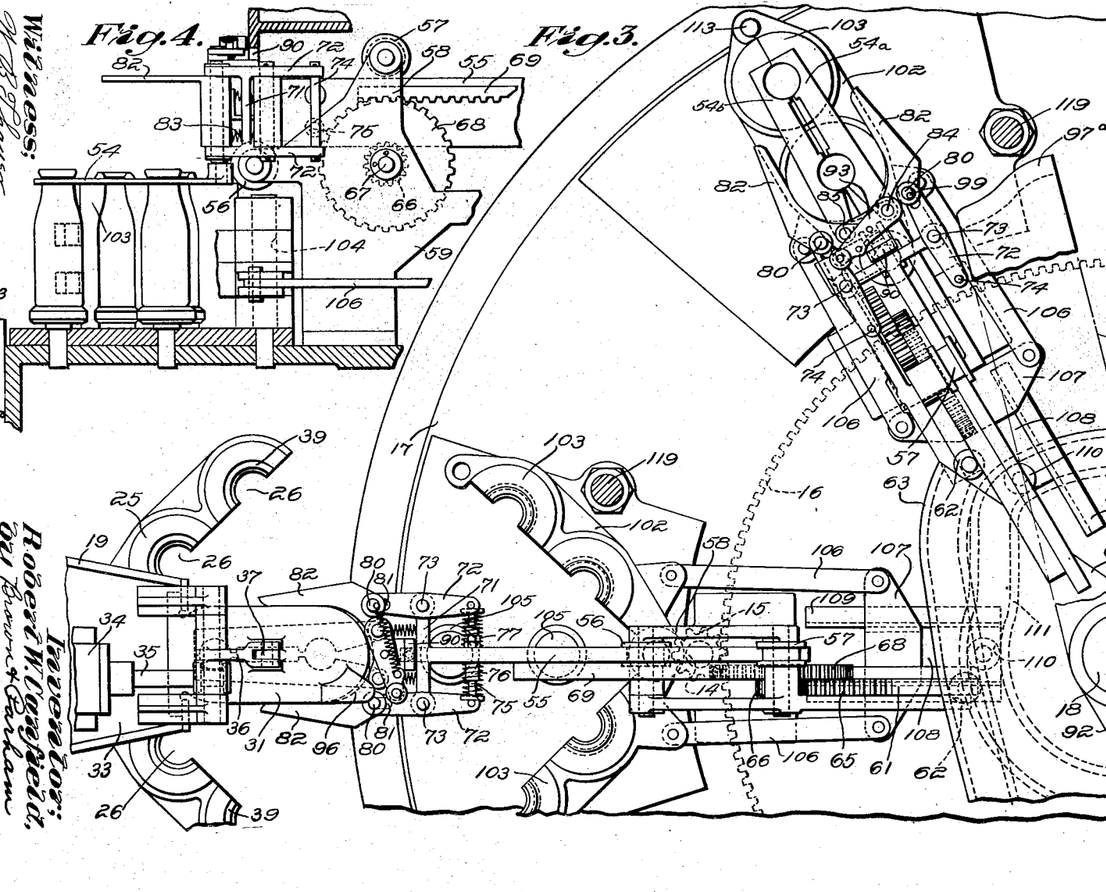
Fig. 3 is a view in top plan of the apparatus shown in Fig. 1.
Fig. 4 is a view in longitudinal sectional elevation of a fragmentary portion of the machine, showing principally the tongs mechanism and blanks carried thereby after the tongs have operated to engage the completed articles to transfer them from the blow mold to the take out table.

Considering now the construction of the divided plural cavity blow mold, and referring particularly to Figs. 1 and 3, it will be seen that each blow mold unit comprises a pair of cooperative mold holders 102, each of which carries a plurality of mold sections 103. These sections may be formed integrally or separately as desired. The mold holders are pivotally mounted upon an upstanding pivot element or stud 104, which stud is mounted directly on the blow mold table. The blow mold unit also may include a plurality of bottom plates 105 which fit in recesses formed in the bottom of the blow mold cavities when the blow mold is closed. For opening and closing the blow mold, links 106 are connected at their outer ends to ears formed on the mold holders and their inner ends to a cross head 107. The cross head 107 is mounted upon a slide 108 located between guides provided on a plate 109 mounted on the blow mold table. The slide 108 is moved inwardly and outwardly radially of the blow mold to open and close the blow mold. Such movements are effected at appropriate times by means of a cam roller 110 carried by the slide, and which travels in a cam path 111 formed in a stationary plate 112 mounted on the column 18 of the blow mold table. The shape of the cam path 111 is such as to cause the blow mold to open as it approaches the transfer position; to close the blow mold after the blanks have been moved into alignment with the bottom plates 63 of the blow mold; and to open the blow mold at the takeout position after the blanks have been blown to final form.

To insure that the blow mold will be closed during the blowing operation, a pin 113 is slidably mounted in a vertical opening formed in the blow mold table near the periphery thereof. This pin carries a cam roller 114 adapted to travel along a suitable cam path, not shown. The cam path causes the pin 113 to be projected upwardly through perforated lugs 115 provided on the outer ends of the mold section holders 102 and pairs of which overlap each other when the mold is closed. This serves to securely lock the blow mold sections together. When the blanks have been blown to final form, the pin 113 is lowered, unlocking the blow mold.

A plural cavity blow head designated generally at 118 is supported on a column 119 in vertical alignment with the blow mold. Suitable mechanism (not shown) is provided for causing the blow head to be brought into engagement with the blow mold after previously formed blanks have been transferred thereto to blow the blanks to final form. The said mechanism may then operate to disengage the blow head from the blow mold. The construction of the blow head unit and the operating mechanism therefor, are not shown in greater detail because per se they form no part of the present invention.

Figure 8:
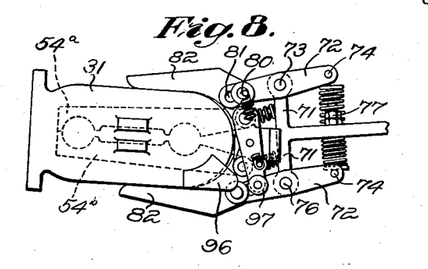
Fig. 8 is a view in top plan showing one of the tongs mechanism in offset position and in engagement with a blank forming unit.

The operation of the above described apparatus may be substantially as follows:

The continuous rotation of the blank mold table causes the plural cavity glass receiving and blank forming units successively to gather charges of glass from the gathering pool 46. These charges of glass are formed into blanks in the blank mold unit, as previously described, and as the blank forming unit is moved toward transfer position, the blank mold opens leaving the blanks supported between the bottom plates and the blow head. At the same time, the cooperating tongs transfer mechanism is moved toward transfer position. The transfer mechanism is moved radially of the blow mold table to move the tongs members toward the blanks and to bring the guide 82 into engagement with the blow head 31. Such engagement may be completed prior to the time that the blank head unit and the tongs carriage come into alignment with each other because of the pivotal connection of the guide and the tongs with the carriage. Thus the tongs members and the guide may be moved horizontally out of alignment with the carriage about the pivot elements 73 and into the offset position in which the tongs and guide are shown in Fig. 8. The slotted connection between the member 79, upon which the guide 82 is formed, and the carriage, permits free floating operation of the tongs members and the guide relative to the carriage. This insures proper engagement of the guide 82 with the head 31 to align the tongs with the blanks and to permit the tongs to travel in a path coincident with the path of movement of the blanks, during the period in which the transfer or removal of the blanks from the blank forming unit is being accomplished. At the proper time, the cam 96 on the blow head 31 engages cam roller 97 on crank arm 93 to close the tongs about the blank. During the continuous movement of the tongs mechanism with the blank forming unit, the bottom plates are lowered and the head 31 is raised, leaving the blanks supported solely by the tongs. During this operation and for a brief period thereafter, the tongs mechanism may be flexed about the pivots 73 into a position in advance of the tongs carriage or in an offset position opposite to the position in which the mechanism is shown in Fig. 8.

Continued rotation of the mold tables and inward radial movement of the tongs carriage causes the blank forming unit and transfer device to be separated, whereupon the springs 76 and 83 operate to restore the alignment of the tongs with the carriage 55. Hence, the blanks carried by the tongs are rotated about a vertical axis as a unit out of alignment with the blank mold and into radial alignment with the finishing mold. Subsequently, further inward radial movement is imparted to the tongs carriage, the blanks being moved into vertical alignment with the bottom plates of the blow mold. As the blanks and the blow molds rotate together about the axis of the blow mold table, the blow mold is closed about the blanks and when the cam roller 97 on the crank arm 93 engages the cam 97a, Fig. 5, the tongs are opened, leaving the blanks supported solely by the blow mold. The blow head 118 then is brought into engagement with the blow mold during the continued rotation of both of them, and the blanks are blown to final form. Upon completion of the blowing operation, and as the blow mold moves toward the takeout position, the cam or runner 90 of the tongs mechanism comes into engagement with cam 91 and the crank arm 93 is simultaneously operated by the cam 96a to close the tongs about the necks of the finished articles. At this time, the transfer device is moved outwardly radially of the blow mold table toward the takeout table D. When the rotation of the tongs by the blow mold table and the radial movement of the tongs carries the blanks into position to be placed on the takeout table, the tongs are opened by the engagement of roller 97 with cam 97b. Inward radial movement of the tongs relative to the blow mold table at this time permits the tongs to swing clear of the articles on the takeout table and the tongs and co-operating blow mold are then carried toward the transfer position to begin another cycle of operations.

It is to be understood that my invention is not limited to the exact embodiment illustrated and described herein, and that various changes may be made in the details of construction without departing from the principles of the invention as defined in the appended claims. Thus, my invention may be employed to advantage in any type of suction gathering machine such as the type in which both divided neck molds and cooperative body parison molds are used, either of which may be opened prior to the opening of the other to permit a previously formed blank to be engaged by the tongs and transferred to a finishing mold on the finishing mold table. This application discloses subject matter broadly related to and contained in my copending application Ser. No. 419,513 filed Jan. 9, 1930, a continuation in part of the present application. Certain of the claims contained herein are generic to the specific forms of the invention disclosed respectively in this and the above identified application. My invention also may be employed equally well in machines of the type in which each of the molds has but a single cavity which for example may be designed to form oval or panel bottles and/or in which glass is fed to the blank molds in gobs.

Having thus described my invention, what I desire to claim and secure by Letters Patent is:

1. A two-table glassware forming machine, comprising a blank mold unit mounted on one of said tables, a finishing mold unit mounted on the other of said tables, transfer tongs for transferring a blank from the blank mold to the finishing mold, said tongs being supported by a carriage mounted on the finishing mold table, means for opening and closing said tongs, means for bodily oscillating said tongs relative to said carriage, and means for effecting radial movements of said carriage and the tongs supported thereby relative to the finishing mold table.

2. A continuously rotating two-table glassware forming machine, comprising a plural cavity blank forming unit mounted on one of said tables, a plural cavity finishing mold unit stationarily mounted on the other of said tables, ware gripping transfer members adapted to engage a plurality of blanks, the continuous rotation of said tables causing said blank forming unit and said members to be moved toward a transfer point, means for moving said members in alignment with the blanks formed in and carried by said blank forming units, means for horizontally moving said members including means for aligning said members vertically and radially with the mold cavities of said finishing mold unit, and for maintaining such alignment while the mold unit rotates, and means for operating said members to release blanks therefrom to the finishing mold unit during such rotation.

3. A two-table glassware forming machine, comprising a plural cavity blank forming unit mounted on one of said tables, a plural cavity finishing mold unit mounted on the other of said tables, transfer tongs mounted on the finishing mold table and adapted to engage a plurality of blanks, the continuous rotation of the mold tables causing the blank forming unit and the transfer tongs to be moved toward a transfer point, means for causing said tongs to be moved into radial alignment with the blanks carried by said blank forming unit, while said unit rotates, and means for causing said tongs to travel along a path coincident with the paths of travel of said blanks while held in radial alignment therewith by said last-named means.

4. A two-table glassware forming machine, comprising a plural cavity blank forming unit mounted on one of said tables, a plural cavity finishing mold unit mounted on the other of said tables, a carriage mounted on one of said mold tables, transfer tongs pivotally supported by said carriage for oscillatory movement relative thereto and adapted to be opened and closed, and means for controlling the movements of said carriage and for oscillating the tongs supported thereby, to effect the transfer of a plurality of blanks from the blank forming unit to the finishing mold unit during the continuous rotation of the mold tables.

5. In apparatus of the character described, a continuously rotating table, a transfer device mounted on said table, said transfer device comprising a carriage, tongs supported by said carriage, means for causing radial movement of said carriage and the tongs supported thereby relative to said table, pivotal connections between said tongs and said carriage to permit horizontal oscillatory movement of the tongs relative to the carriage, means for periodically oscillating said tongs, and snap acting means for opening and closing said tongs.

6. A two-table glassware forming machine, comprising a plural cavity blank forming unit mounted on one of said tables, a plural cavity finishing mold mounted on the other of said tables, a transfer device carried by said finishing mold table, said transfer device comprising a carriage, tongs pivotally connected to said carriage, and adapted to be moved horizontally relative to said carriage, the continuous rotation of said tables causing said blank forming unit and said transfer device to be moved toward a transfer position, guide means connected with said tongs for engaging a portion of said blank forming unit to move said tongs into alignment with the blanks carried by said unit, means for closing said tongs to engage the blanks carried by said unit, means for causing radial movement of said carriage and the tongs connected thereto for moving the blanks into alignment with the cavities in the finishing mold, means for closing the finishing mold about said blanks, means for opening said tongs to release said blanks, the continuous rotation of the finishing mold table causing the finishing mold and transfer device to be moved toward a takeout position, and means for causing vertical movement of said tongs relative to said carriage for effecting the removal of the completed articles from the finishing mold.

7. Apparatus of the character described comprising a plural cavity blank mold unit, means for continuously rotating said blank mold unit about one axis, a plural cavity finishing mold unit, means for continuously rotating said finishing mold unit about a different axis, means operating in synchronism with the movements of said mold units for simultaneously transferring a plurality of blanks from the blank mold unit to the finishing mold unit, means for rotating said transfer means and blanks about a vertical axis to align said blanks with the molds of the finishing mold unit, means for laterally moving the transfer means and blanks into vertical alignment with the finishing mold unit, and means for closing the molds of the finishing mold unit about said blanks.

8. Apparatus for forming glassware comprising a pair of eccentrically mounted horizontal mold tables, mold units mounted respectively on said tables, means for continuously rotating said tables, and ware transfer means for transferring ware from one mold unit on one table to a receiving mold unit on the other table and comprising a support mounted for angular movement about the axis of one of the mold tables, a ware gripping device carried by said support, means for effecting relative horizontal movement between said support and the receiving mold to alternately move the ware gripping device while in vertical alignment with the traveling mold units on the respective tables, and means for periodically oscillating said ware gripping device horizontally relative to its support to align said device with one of said mold units.

9. Apparatus for forming glassware comprising a pair of eccentrically mounted horizontal mold tables, mold units mounted respectively on said tables, means for continuously rotating said tables, and ware transfer means for transferring ware from one mold unit on one table to the mold unit on the other table and comprising a support, a ware gripping device carried by said support, means including means for imparting horizontal movement to said support to alternately move the ware gripping device while in vertical alignment with the traveling mold units on the respective tables, and a guide mounted on one of said tables for oscillating said ware gripping device relative to its support to align the device with the mold unit on the table upon which said guide is mounted.

10. Apparatus for forming glassware, comprising a pair of eccentrically mounted tables, a blank forming unit mounted on one table and a blank receiving means mounted on the other table, means for continuously rotating said tables whereby said unit and blank receiving means are moved through a transfer zone between the tables, said blank forming unit including a blank mold and means associated therewith for supporting a blank formed therein when the blank mold has opened, a support for said blank receiving means, means for connecting said blank receiving means to said support for angular movement relative thereto, means for causing coincident travel of said blank supporting means and said blank receiving means in the transfer zone, means connected to said blank receiving means for imparting angular movement thereto relative to its support, and means carried by the blank mold table for operating said last-named means to prevent relative angular movement between the blank supporting and receiving means during the coincident travel thereof.

11. In a machine for forming glass articles, the combination of a continuously rotating blank mold carriage, a blank mold thereon, a continuously rotating finishing mold carriage, a finishing mold thereon, said carriages being arranged side-by-side, an arm mounted on one of said carriages, a parison transfer device supported on said arm, means for projecting said arm outwardly of the table upon which it is mounted, and means for horizontally moving the transfer device relative to said arm to effect alignment of said device with one of said molds.

12. A glassware forming machine comprising a mold table mounted for rotation about a vertical axis, a plural cavity mold unit thereon, means for rotating said mold table, means for shaping articles of glassware in said mold unit, and means for simultaneously removing said articles from said mold unit including ware-holding means, means for causing said ware-holding means to travel about the axis of said mold table in vertical alignment with the articles in said unit while said unit is moving, means for closing the ware holding means about the articles during such travel, means for thereafter moving said ware-holding means outwardly of said mold table relative to said mold unit, means for thereafter moving said ware-holding means about an axis eccentric to the axis of said mold table, and means for opening the ware-holding means during such movement to deliver the articles carried by said ware-holding means at the desired places.

13. A glassware forming machine comprising a finishing mold table mounted for rotation about a vertical axis, a plural cavity finishing mold unit carried by said table, means for rotating said table, means including a plural blowhead for shaping articles of finished glassware in the cavities of said unit, and means for removing said finished articles from said mold unit including ware-holding means, means for causing said ware-holding means to travel in vertical alignment with the cavities of said unit while said unit is moving, means for closing said ware-holding means about the finished articles during such travel, means for thereafter moving said ware-holding means outwardly of said finishing mold table relative to said mold unit, and means for thereafter opening the ware-holding means to deliver ware carried thereby at the desired places.

Signed at Hartford, Connecticut, this 12th day of June, 1929.

ROBERT W. CANFIELD.